(12) United States Patent
Hou et al.

(10) Patent No.: US 12,233,579 B2
(45) Date of Patent: Feb. 25, 2025

(54) FOAMING AND SHAPING PROCESS FOR A THERMOPLASTIC SHEET, AND ASSOCIATED APPARATUS AND SHAPED FOAMED THERMOPLASTIC SHEET

(71) Applicant: SHPP GLOBAL TECHNOLOGIES B.V., Bergen op Zoom (NL)

(72) Inventors: Bruce Hou, Shanghai (CN); Chao Liu, Shanghai (CN); Liping Zheng, Shanghai (CN)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 18/290,420

(22) PCT Filed: May 27, 2022

(86) PCT No.: PCT/IB2022/055032
§ 371 (c)(1),
(2) Date: Nov. 13, 2023

(87) PCT Pub. No.: WO2023/281329
PCT Pub. Date: Jan. 12, 2023

(65) Prior Publication Data
US 2024/0246267 A1     Jul. 25, 2024

(30) Foreign Application Priority Data
Jul. 9, 2021   (EP) ..................... 21184715

(51) Int. Cl.
*B29C 43/00*     (2006.01)
*B29C 44/00*     (2006.01)
(Continued)

(52) U.S. Cl.
CPC ........ *B29C 43/003* (2013.01); *B29C 44/3453* (2013.01); *B29C 44/5636* (2013.01);
(Continued)

(58) Field of Classification Search
CPC .. B29C 70/50; B29C 43/021; B29C 2043/023
See application file for complete search history.

(56) References Cited

U.S. PATENT DOCUMENTS 3,317,363 A * 5/1967 Weber ................. B29C 66/7392
264/48
3,445,553 A * 5/1969 Hardigg .............. B29C 44/1266
264/46.7
(Continued)

FOREIGN PATENT DOCUMENTS

DE    3644144 A1 *  7/1988  ........... B30B 15/062
EP    1059327 A1    12/2000
(Continued)

OTHER PUBLICATIONS

DE3644144A1 (Harald) Jul. 1988 (online machine translation), [Retrieved on Aug. 2, 2024]. Retrieved from: Espacenet (Year: 1988).*
(Continued)

*Primary Examiner* — Alison L Hindenlang
*Assistant Examiner* — Andres E. Behrens, Jr.
(74) *Attorney, Agent, or Firm* — CANTOR COLBURN LLP

(57) ABSTRACT

A method of foaming and shaping a thermoplastic sheet comprising a poly(phenylene ether), a polyetherimide, or a combination thereof includes foaming the thermoplastic sheet with supercritical carbon dioxide to form a foamed thermoplastic sheet, and shaping the foamed thermoplastic sheet to form a shaped foamed thermoplastic sheet. The shaping step includes compressing the foamed thermoplastic sheet between a first metal plate and a secondi metal plate, each of which has a grooved surface facing the thermoplastic sheet. The first metal plate and the second metal plate are connected by a flexible, compressible linkage capable. When the flexible, compressible linkage is in its uncom-
(Continued)

pressed state, only the second (lower) metal plate is in contact with the shaped foamed thermoplastic sheet. When the flexible, compressible linkage is in its compressed state, both the first (upper) and second (lower) metal plates are in contact with the shaped foamed thermoplastic sheet.

15 Claims, 4 Drawing Sheets

(51) Int. Cl.
  *B29C 44/34* (2006.01)
  *B29C 44/56* (2006.01)
  *B29K 71/00* (2006.01)
  *B29K 79/00* (2006.01)
  *B29K 105/00* (2006.01)
  *B29K 105/04* (2006.01)
  *B29L 31/34* (2006.01)

(52) U.S. Cl.
  CPC .... *B29K 2071/12* (2013.01); *B29K 2079/085* (2013.01); *B29K 2105/0026* (2013.01); *B29K 2105/0088* (2013.01); *B29K 2105/04* (2013.01); *B29K 2995/0012* (2013.01); *B29L 2031/3468* (2013.01)

(56) References Cited

U.S. PATENT DOCUMENTS

| | | | |
|---|---|---|---|
| 4,610,837 A * | 9/1986 | Frey | B29C 53/28 264/339 |
| 5,626,954 A * | 5/1997 | Andersen | B28B 11/003 428/152 |
| 5,670,102 A | 9/1997 | Perman et al. | |
| 8,879,249 B1 * | 11/2014 | Wanderman | G06F 1/1656 361/679.55 |
| 9,505,177 B2 * | 11/2016 | Fujioka | B29C 70/46 |
| 2004/0080070 A1 | 4/2004 | Liu et al. | |
| 2011/0189465 A1 | 8/2011 | Maurer et al. | |
| 2013/0127082 A1 * | 5/2013 | Wang | B29C 44/5627 264/41 |
| 2014/0154349 A1 * | 6/2014 | Nosker | B29C 43/34 425/143 |
| 2018/0079191 A1 * | 3/2018 | Rodgers | B29C 71/02 |
| 2021/0276235 A1 * | 9/2021 | Parameshwara | B29C 43/18 |

FOREIGN PATENT DOCUMENTS

| | | |
|---|---|---|
| EP | 2672614 A1 | 12/2013 |
| EP | 2787513 A1 | 10/2014 |
| TW | M396194 U | 1/2011 |
| WO | 0164412 A2 | 9/2001 |

OTHER PUBLICATIONS

Extended Search Report for European Application No. 21184715.7, International Filing Date Jul. 9, 2021, Date of Mailing Nov. 25, 2021; 5 pages.

International Search Report and Written Opinion for PCT Application No. PCT/IB2022/055032; International Filing Date May 27, 2022, Date of Mailing Sep. 9, 2022; 11 pages.

* cited by examiner

FOAMING AND SHAPING PROCESS FOR A THERMOPLASTIC SHEET, AND ASSOCIATED APPARATUS AND SHAPED FOAMED THERMOPLASTIC SHEET

CROSS REFERENCE TO RELATED APPLICATIONS

This application is a National Stage filing of International Application No. PCT/182022/055032, filed on May 27, 2022, which claims the benefit of EP Application No. 21184715.7, filed on Jul. 9, 2021, both of which are incorporated by reference herein in-its their entirety.

BACKGROUND OF THE INVENTION

Foaming of thermoplastics with supercritical carbon dioxide is a cost-effective and residue-free method of forming foamed thermoplastic sheets. A combination of a foaming step and a subsequent shaping step is commercially practiced primarily for thermoplastics with glass transition temperatures less than 0° C. including polypropylenes, thermoplastic polyurethanes, ethylene-vinyl acetate copolymers, and polyester elastomers. Typically, foaming is conducted in a high-temperature foaming machine, then the foamed sheet is transferred to a separate room temperature machine for cooling and shaping. The process works well for thermoplastics with glass transition tem less than 0° C., because the foamed sheets are still soft when they are transferred to the room temperature cooling and shaping machine. However, application of this two-step process to thermoplastics with higher glass transition temperatures is problematic in that the foamed sheets are prone to cracking, surface deformation, and non-uniform foamed sheet thickness and density. There is therefore a need for an improved process of cooling and shaping foamed sheets prepared with supercritical carbon dioxide from thermoplastics having a glass transition temperature of at least 20° C.

BRIEF SUMMARY OF EMBODIMENTS OF THE INVENTION

One embodiment is a method of foaming and shaping a thermoplastic sheet, comprising: foaming a thermoplastic sheet with supercritical carbon dioxide to form a foamed thermoplastic sheet; wherein the thermoplastic sheet comprises a thermoplastic composition comprising a poly(phenylene ether), a polyetherimide, or a combination thereof; and wherein the thermoplastic composition is characterized by a glass transition temperature of 20 to 300° C. determined by differential scanning calorimetry according to ASTM D3418-15 at heating rate of 20° C./minute; and shaping the foamed thermoplastic sheet to form a shaped foamed thermoplastic sheet; wherein the shaping comprises compressing the foamed thermoplastic sheet between a first metal plate and a second metal plate; wherein a surface of the first metal plate and a surface of the second metal plate comprise a plurality of grooves, each groove having a width of 0.1 to 1 millimeter and a depth of 0.1 to 1 millimeter, and each groove being separated from the nearest groove by a center-to-center distance of 0.5 to 5 millimeters; wherein the first metal plate and the second metal plate are connected by a flexible linkage capable of modulating a separation between the first metal plate and the second metal plate; and wherein the compressing the foamed thermoplastic sheet between a first metal plate and a second metal plate comprises controlling a minimum separation of the first metal plate and the second metal plate.

Another embodiment is a shaped foamed thermoplastic sheet produced by the method in any of its variations described herein and comprising a plurality of projections corresponding to the plurality of grooves of the first metal plate and the second metal plate.

Another embodiment is an electric vehicle battery comprising the shaped foamed thermoplastic sheet in any of its variations.

Another embodiment is an apparatus for shaping a foamed thermoplastic sheet, comprising: a first metal plate and a second metal plate; wherein each of the first metal plate and the second metal plate comprises a thermoplastic-facing major surface; wherein the thermoplastic-facing major surface of the first metal plate or the second metal plate or both comprises a plurality of grooves, each groove having a width of 0.1 to 1 millimeter and a depth of 0.1 to 1 millimeter; and wherein the thermoplastic-facing major surface of the first metal plate or the second metal plate or both comprises a rigid spacer to control the minimum separation of the first metal plate and the second metal plate; a flexible linkage connecting the first metal plate and the second metal plate, the flexible linkage being capable of modulating a separation between the first metal plate and the second metal plate; and a hydraulic system capable of compressing the flexible linkage connecting the first metal plate and the second metal plate.

These and other embodiments are described in detail below.

BRIEF DESCRIPTION OF THE DRAWINGS

In the drawings, like elements are numbered alike in several figures.

DETAILED DESCRIPTION OF THE INVENTION

Figure 1:
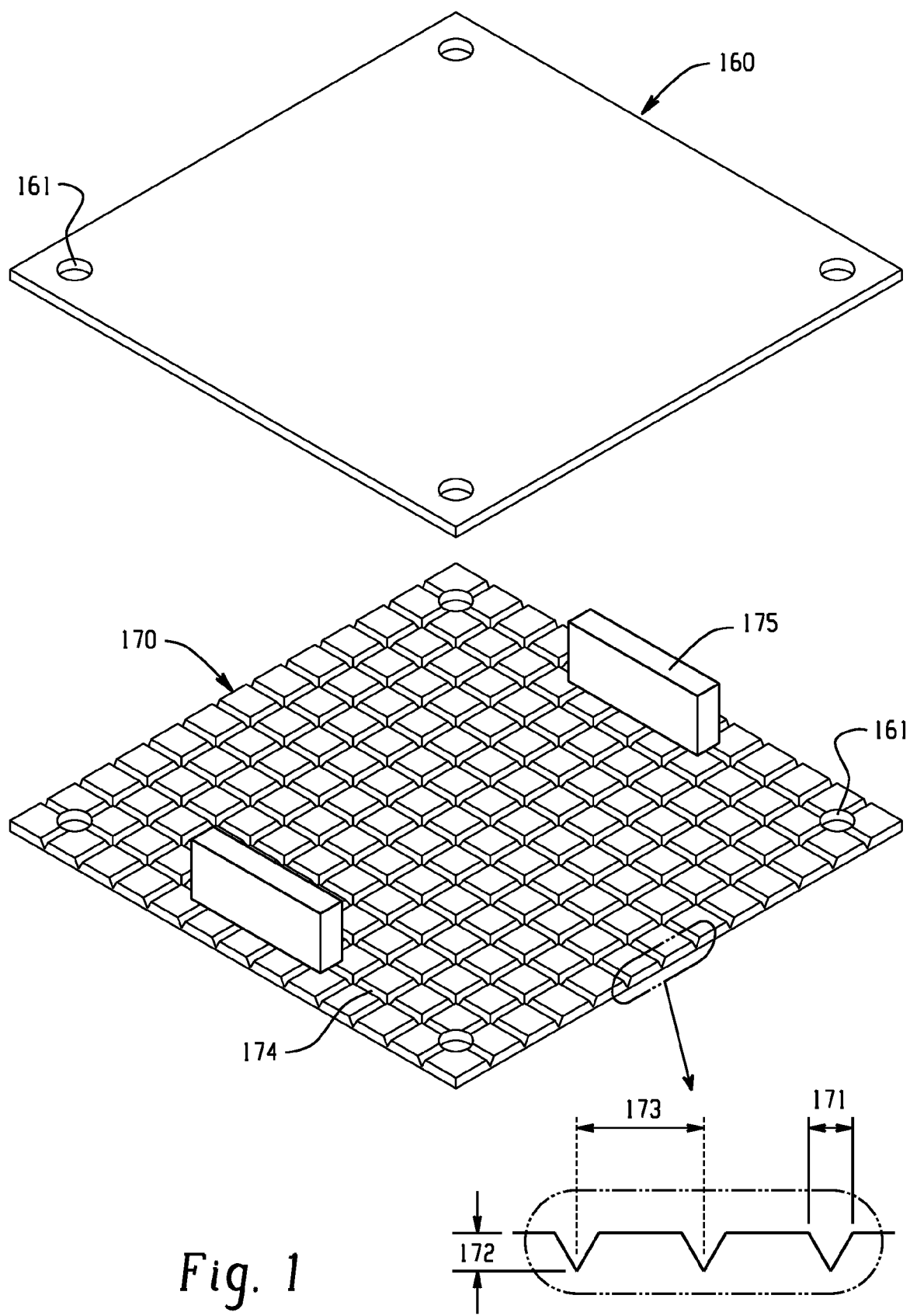
FIG. 1 is a schematic illustration of a first metal plate 160 and a second metal plate 170; the inset is an enlarged cross-sectional view of a portion of second metal plate 170.

The present inventors have determined that thermoplastics having a glass transition temperature of at least 20° C. can be foamed with supercritical carbon dioxide, then cooled and shaped without cracking, surface deformation, non-uniform foamed sheet thickness, or non-uniform foamed sheet density by a process including a cooling and shaping step that utilizes grooved metal plates connected by a flexible linkage.

Thus, one embodiment is a method of foaming and shaping a thermoplastic sheet, comprising: foaming a thermoplastic sheet with supercritical carbon dioxide to form a foamed thermoplastic sheet; wherein the thermoplastic sheet comprises a thermoplastic composition comprising a poly (phenylene ether), a polyetherimide, or a combination thereof; and wherein the thermoplastic composition is characterized by a glass transition temperature of 20 to 300° C. determined by differential scanning calorimetry according to ASTM D3418-15 at heating rate of 20° C./minute; and shaping the foamed thermoplastic sheet to form a shaped foamed thermoplastic sheet; wherein the shaping comprises compressing the foamed thermoplastic sheet between a first metal plate and a second metal plate; wherein a surface of the first metal plate and a surface of the second metal plate comprise a plurality of grooves, each groove having a width of 0.1 to 1 millimeter and a depth of 0.1 to 1 millimeter, and each groove being separated from the nearest groove by a center-to-center distance of 0.5 to 5 millimeters; wherein the first metal plate and the second metal plate are connected by a flexible linkage capable of modulating a separation between the first metal plate and the second metal plate; and wherein the compressing the foamed thermoplastic sheet between a first metal plate and a second metal plate comprises controlling a minimum separation of the first metal plate and the second metal plate.

The first metal plate, the second metal plate, and the flexible linkage collectively form a dual-plate/soft-link module. The flexible linkage allows the dual-plate/soft-link module to be compressible, thereby modulating the separation between the first metal plate and the second metal plate. When the dual-plate/soft-link module is uncompressed, the separation between the first metal plate and the second metal plate is such that the first (upper) metal plate is not in contact with shaped foamed thermoplastic sheet. When the dual-plate/soft-link module is compressed, the separation between the first metal plate and the second metal plate is such that the first (upper) metal plate and the second (lower) metal plate are both in contact with the shaped foamed thermoplastic sheet. The minimum separation between the first and second metal plates is controlled by one or more rigid spacers attached to the thermoplastic-facing surfaces of first metal plate, the second metal plate, or both.

In some embodiments of the method, the flexible linkage comprises a metal wire, a metal band, poly(para-phenylene terephthalamide) fibers, carbon fibers, glass fibers, or a combination thereof. In some embodiments of the method, the flexible linkage comprises a metal wire, a metal band, or a combination thereof. In some embodiments, the flexible linkage comprises a metal wire or a metal band comprising galvanized iron comprising 99.9 to 99.99 weight percent iron and 0.01 to 0.1 weight percent carbon, based on the weight of galvanized iron.

The thermoplastic-facing major surfaces of the first metal plate and the second metal plate comprise a plurality of grooves, each groove having a width of 0.1 to 1 millimeter and a depth of 0.1 to 1 millimeter, and each groove being separated from the nearest groove by a center-to-center distance of 0.5 to 5 millimeters. Within these ranges, the width can be 0.2 to 1 millimeter, the depth can be 0.2 to 1 millimeter, and the center-to-center groove separation can be 1 to 5 millimeters. In some embodiments, the metal plate surfaces comprise a plurality of parallel grooves. In some embodiments, the metal plate surfaces comprise a first set of parallel grooves and a second set of parallel grooves, wherein the grooves of the first set are perpendicular to the grooves of the second set.

In some embodiments, foaming a thermoplastic sheet with supercritical carbon dioxide to form a foamed thermoplastic sheet comprises venting the carbon dioxide from the foaming machine in 10 seconds or less, or 5 seconds or less, or 3 seconds or less.

The thermoplastic composition is characterized by a glass transition temperature of 20 to 300° C. determined by differential scanning calorimetry according to ASTM D3418-15 at heating rate of 20° C./minute. Within this range, the glass transition temperature can be 50 to 300° C., or 100 to 300° C. or 120 to 300° C.

In some embodiments of the method, the thermoplastic composition comprises a poly(phenylene ether). For example, the thermoplastic composition can comprise, based on the total weight of the thermoplastic composition, 40 to 78 weight percent of the poly(phenylene ether); 10 to 48 weight percent of polystyrene, a rubber-modified polystyrene, or a combination thereof; 2 to 10 weight percent of a block copolymer comprising a polystyrene block and a polybutadiene block, a block copolymer comprising a polystyrene block and a hydrogenated polybutadiene block, or a combination thereof; and 10 to 20 weight percent of a flame retardant; wherein the sum of the weight percents of the poly(phenylene ether), the polystyrene or rubber-modified polystyrene or combination thereof, the block copolymer, and the flame retardant is 95 to 100 weight percent. As another example, the thermoplastic composition can comprise, based on the total weight of the thermoplastic composition, 50 to 78 weight percent of the poly(phenylene ether); 10 to 38 weight percent of polystyrene, a rubber-modified polystyrene, or a combination thereof; 2 to 10 weight percent of a block copolymer comprising a polystyrene block and a polybutadiene block, a block copolymer comprising a polystyrene block and a hydrogenated polybutadiene block, or a combination thereof; and 10 to 20 weight percent of a flame retardant; wherein the sum of the weight percents of the poly(phenylene ether), the polystyrene or rubber-modified polystyrene or combination thereof, the block copolymer, and the flame retardant is 95 to 100 weight percent.

In some embodiments of the method, the thermoplastic composition comprises a polyetherimide.

Another embodiment is a shaped foamed thermoplastic sheet produced by any of the above-described embodiments of the method, and comprising a plurality of projections on its two major faces, the plurality of projections corresponding to the plurality of grooves of the first metal plate and the second metal plate.

Another embodiment is a shaped foamed thermoplastic sheet produced by any of the above-described variations of the method, and comprising a poly(phenylene ether). For example, the thermoplastic composition can comprise, based on the total weight of the thermoplastic composition, 40 to 78 weight percent of the poly(phenylene ether); 10 to 48 weight percent of polystyrene, a rubber-modified polystyrene, or a combination thereof; 2 to 10 weight percent of a block copolymer comprising a polystyrene block and a polybutadiene block, a block copolymer comprising a polystyrene block and a hydrogenated polybutadiene block, or a combination thereof; and 10 to 20 weight percent of a flame retardant; wherein the sum of the weight percents of the poly(phenylene ether), the polystyrene or rubber-modified polystyrene or combination thereof, the block copolymer, and the flame retardant is 95 to 100 weight percent. As another example, the thermoplastic composition can comprise, based on the total weight of the thermoplastic composition, 50 to 78 weight percent of the poly(phenylene ether); 10 to 38 weight percent of polystyrene, a rubber-modified polystyrene, or a combination thereof; 2 to 10 weight percent of a block copolymer comprising a polystyrene block and a polybutadiene block, a block copolymer comprising a polystyrene block and a hydrogenated polybutadiene block, or a combination thereof; and 10 to 20 weight percent of a flame retardant; wherein the sum of the weight percents of the poly(phenylene ether), the polystyrene or rubber-modified polystyrene or combination thereof, the block copolymer, and the flame retardant is 95 to 100 weight percent.

Another embodiment is a shaped foamed thermoplastic sheet produced by any of the above-described variations of the method, and comprising a polyetherimide.

Another embodiment is an electric vehicle battery comprising the shaped foamed thermoplastic sheet in any of its above-described variations.

Another embodiment is an apparatus for shaping a foamed thermoplastic sheet, comprising: a first metal plate and a second metal plate; wherein each of the first metal plate and the second metal plate comprises a thermoplastic-facing major surface; wherein the thermoplastic-facing major surfaces of the first metal plate and the second metal plate comprise a plurality of grooves, each groove having a width of 0.1 to 1 millimeter and a depth of 0.1 to 1 millimeter, and each groove being separated from the nearest groove by a center-to-center distance of 0.5 to 5 millimeters; and wherein the thermoplastic-facing major surface of the first metal plate or the second metal plate or both comprises a rigid spacer to control the minimum separation of the first metal plate and the second metal plate; a flexible linkage connecting the first metal plate and the second metal plate, the flexible linkage being capable of modulating a separation between the first metal plate and the second metal plate; and a hydraulic system capable of compressing the flexible linkage connecting the first metal plate and the second metal plate. FIG. 1 is a schematic illustration of a first metal plate 160 and a second metal plate 170, each comprising perforations 161. The thermoplastic-facing surface of the second metal plate 170 includes grooves 174 and includes two rigid spacers 175 to control the minimum separation of first metal plate 160 and second metal plate 170. The FIG. 1 inset is an enlarged cross-sectional view of a portion of second metal plate 170 and illustrates groove width 171, groove depth 172, and center-to-center groove separation 173.

In some embodiments of the apparatus, the flexible linkage comprises a metal wire, a metal band, poly(para-phenylene terephthalamide) fibers, carbon fibers, glass fibers, or a combination thereof. In some embodiments of the method, the flexible linkage comprises a metal wire, a metal band, or a combination thereof. In some embodiments, the flexible linkage comprises a metal wire or a metal band comprising galvanized iron, wherein the galvanized iron comprises 99.9 to 99.99 weight percent iron and 0.01 to 0.1 weight percent carbon, based on the weight of galvanized iron.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLES

Components used in these experiments are summarized in Table 1.

TABLE 1

| Material | Description |
| --- | --- |
| PPE 1 | Poly(2,6-dimethyl-1,4-phenylene ether) having an intrinsic viscosity of about 0.46 deciliter/gram, measured at 23° C. in chloroform by Ubbelohde viscometer. |
| PPE 2 | Poly(2,6-dimethyl-1,4-phenylene ether) having an intrinsic viscosity of about 0.40 deciliter/gram, measured at 23° C. in chloroform by Ubbelohde viscometer. |
| HIPS | Rubber-modified polystyrene having a polystyrene content of about 89 weight percent. |
| SBS | Poly(styrene-butadiene-styrene) triblock copolymer having a polystyrene content of about 69 weight percent. |
| FR 1 | Bisphenol A bis(diphenyl phosphate). |
| FR 2 | Aminoethylaminopropylpolysiloxane, CAS Reg. No. 67923-07-3. |
| Additives | One or more additives selected from antioxidants, mold release agents, and colorants. |

Resin compositions are summarized in Table 2, where component amounts are expressed in weight percent based on the total weight of the composition. Compositions were compounded on a 36 millimeter twin-screw extruder operating at barrel temperatures of 200, 230, 260, 260, 280, 280, 280, 285, and 275° C. from feed throat to die, and a die temperature of 275° C. Extrudates were cooled and pelletized, then dried for 3 hours at 100° C. before use for sheet extrusion. Glass transition temperatures, expressed in units of degrees centigrade, were determined by differential scanning calorimetry according to ASTM D3418-15 at heating rate of 20° C./minute.

TABLE 2

| | Resin A | Resin B |
| --- | --- | --- |
| COMPOSITION | | |
| PPE 1 | 50.0 | 0 |
| PPE 2 | 0 | 70.0 |
| HIPS | 30.0 | 10.0 |
| SBS | 2.5 | 5.0 |
| FR 1 | 16.5 | 10.0 |
| FR 2 | 0 | 3.5 |
| Additives | 1.0 | 1.5 |
| PROPERTIES | | |
| Glass transition temperature (° C.) | 125 | 160 |

Sheet extrusion of the resin compositions was conducted on a sheet extrusion apparatus operating at barrel temperatures of 200, 240, 260, 270, 280, 280, 260, 250° C. and a die temperature of 245° C. Sheet thicknesses are specified below in the context of individual experiments.

Example 1

This experiment utilized an extruded sheet of Resin A having a length of 300 millimeters, a width of 200 millimeters, and thickness of 5 millimeters. Also utilized were two aluminum plates with a length of 1000 millimeters, a width of 600 millimeters, and a thickness of 5 millimeters. The inner (thermoplastic-facing) surfaces of both aluminum plates were machined to create a grid of perpendicular micro grooves with a width of 0.5 millimeter, a depth of 0.5 millimeter, and a center-to-center groove separation of 2 millimeters. A dual-plate/soft-link module was created by perforating the four corners of the aluminum plates and connecting the aluminum plates to a soft link consisting of a metal wire hoop having a circular cross-section, a wire cross-sectional diameter of 1 millimeter and a hoop circumference of about 200 millimeters. The metal wire used to form the hoop was a galvanized iron wire containing 99.98 weight percent iron and 0.02 weight percent carbon. The connection of the aluminum plates to the wire hoop was accomplished by looping the wire of the wire hoop multiple times through each hole in the aluminum plates. In the dual-plate/soft-link module, the initial spacing between the two aluminum plates was about 25 millimeters, but the spacing could be reduced by compressing the dual-plate/soft-link module to create a minimum plate spacing equivalent to or slightly less than (e.g., as much as 5 percent less than) the thickness of the final foam sheet. The minimum plate spacing was controlled by two rigid spacers adhered to opposite edges of the thermoplastic-facing surface of the lower aluminum plate.

The extruded sheet was placed between the two aluminum plates, which were separated by about 25 millimeters. The cavity of a foaming machine was pre-heated to 160° C., then the dual-plate/soft-link module containing the extruded sheet was placed in foaming machine 1, and the mold cavity was closed by the hydraulic presses of the foaming machine. Closure of the mold cavity did not affect the plate separation of about 25 millimeters. Then, supercritical carbon dioxide was injected into the cavity of the foaming machine, and a temperature of 160° C. and a pressure of 20 megapascals of carbon dioxide were maintained for 60 minutes.

After the 60 minutes had elapsed, pressure was released through an exhaust port in about 2 seconds, and the cavity was opened. At this point, the foamed sheet had a warped (i.e., non-flat) shape. The dual-plate/soft-link module containing the foamed sheet was rapidly transferred to the shaping machine, which had an initial temperature of about 23° C., and the hydraulic presses of the shaping machine rapidly closed, creating a plate spacing of 21 millimeters and a pressure of about 0.6 megapascals. After five minutes, the hydraulic presses increased the plate spacing to about 25 millimeters, and the foamed sheet was removed from the dual-plate/soft-link module. The resulting flat shaped foamed sheet had a thickness of 21 millimeters, and a density of 0.045 gram/centimeter$^3$, determined according to ASTM D1622-14. The major surfaces of the sheet included projections corresponding to the grooves in the aluminum plates. The shaped foamed sheet did not exhibit cracks or surface wrinkles, and its thickness and density were uniform.

Figure 2:
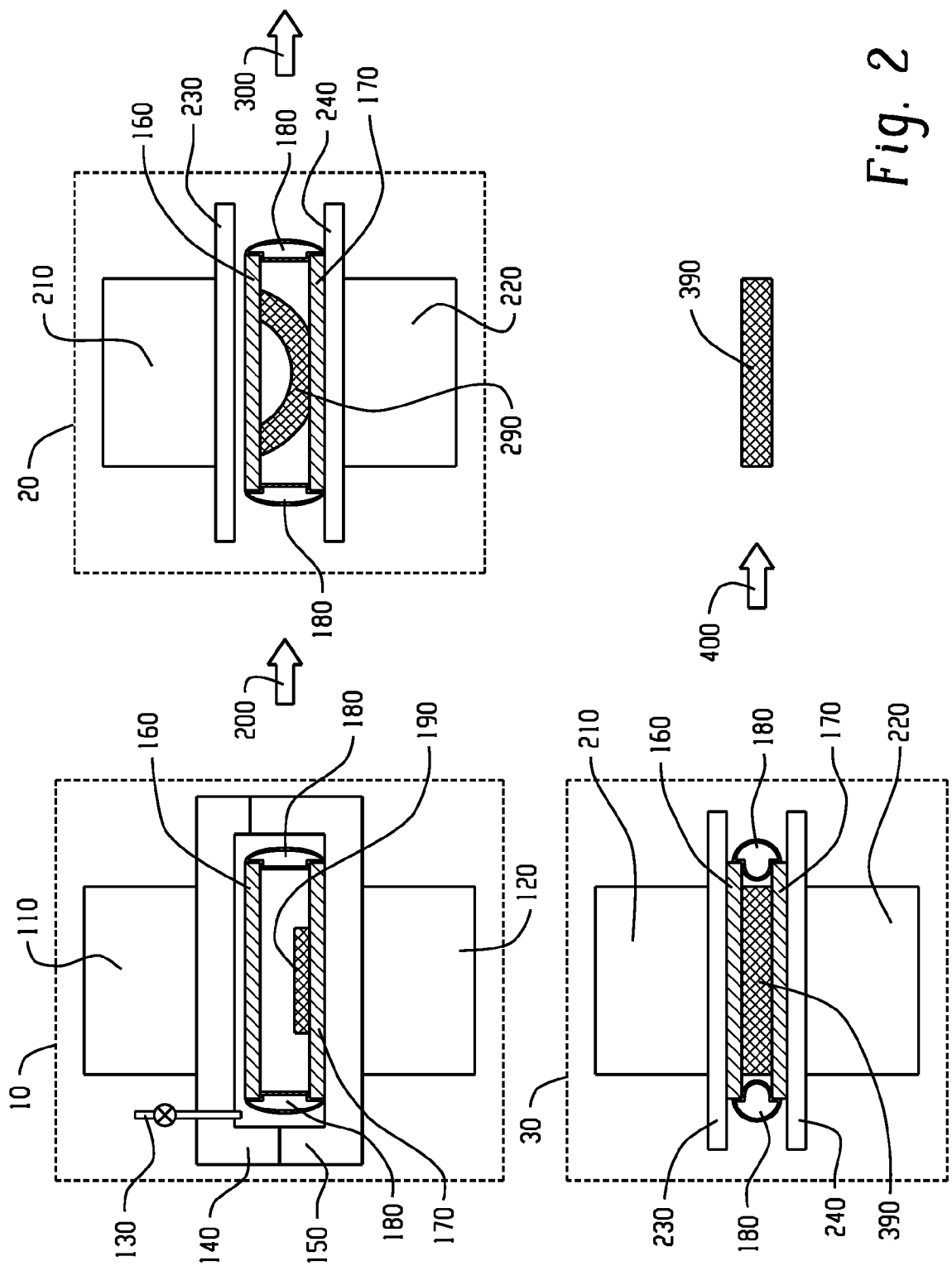
FIG. 2 is a schematic illustration of a process for foaming and shaping a thermoplastic sheet according to the present invention.

FIG. 2 is a schematic illustration of the process for foaming and shaping a thermoplastic sheet according to the present invention and Example 1. The process utilizes a foaming machine 10 and a shaping machine. In FIG. 2, the shaping machine is shown in an uncompressed configuration 20 and a compressed configuration 30. Foaming machine 10 includes a foaming machine upper hydraulic press 110 and a foaming machine lower hydraulic press 120 which control vertical movement of foaming machine upper wall 140 and foaming machine lower wall 150, respectively. Embedded in foaming machine upper wall 140 is carbon dioxide inlet/outlet with valve 130. Pictured within the chamber of foaming machine 10 is a dual-plate/soft-link module, which includes first metal plate 160 and second metal plate 170, which are connected by flexible linkage 180. Unfoamed thermoplastic sheet 190 rests on second metal plate 170. After unfoamed thermoplastic sheet 190 is foamed with carbon dioxide to form foamed unshaped thermoplastic sheet 290 in foaming machine 10, carbon dioxide is vented via carbon dioxide inlet/outlet with valve 130 and the chamber is opened via foaming machine upper hydraulic press 110 and a foaming machine lower hydraulic press 120. The dual-plate/soft-link module is rapidly transferred from foaming machine 10 to shaping machine in uncompressed configuration 20. This transfer is represented by the arrow labeled 200. The shaping machine includes shaping machine upper hydraulic press 210, shaping machine lower hydraulic press 220, shaping machine upper hydraulic press contact plate 230, and shaping machine upper hydraulic press contact plate 240. Shaping machine upper hydraulic press 210 and shaping machine lower hydraulic press 220 are used to convert the shaping machine from its uncompressed configuration 20 to its compressed configuration 30, in which the minimum separation of first metal plate 160 and the second metal plate 170 is controlled by at least one rigid spacer 175 (not shown in FIG. 2 but illustrated in FIG. 1) on the thermoplastic-facing major surface of first metal plate 160 or second metal plate 170 or both. Conversion of the shaping machine from its uncompressed configuration to its compressed configuration is represented by the arrow labeled 300. In the compressed configuration 30 of the shaping machine, the foamed unshaped thermoplastic sheet is shaped and cooled to form shaped foamed sheet without defects 390. Shaping machine upper hydraulic press 210 and shaping machine lower hydraulic press 220 are then used to convert the shaping machine back to its uncompressed configuration 20, the dual-plate/soft-link module is removed from the shaping machine, and shaped foamed sheet without defects 390 is removed from the dual-plate/soft-link module. Removal of the shaped foamed sheet is represented by the arrow labeled 400.

Example 2

The procedure of Example 1 was followed, except that the plate spacing during foaming was about 17 millimeters, foaming was conducted at 145° C., and the plate spacing during shaping was about 10 millimeters. The resulting flat shaped foamed sheet had a thickness of about 10 millimeters, and a density of 0.14 gram/centimeter$^3$, determined according to ASTM D1622-14. The surface of the sheet included projections corresponding to the grooves in the aluminum plates. The shaped foamed sheet did not exhibit cracks or surface wrinkles, and its thickness and density were uniform.

Example 3

The procedure of Example 1 was followed, except that Resin B was used, foaming was conducted at 165° C. for 70 minutes, and the plate spacing during shaping was about 19 millimeters was. The resulting flat shaped foamed sheet had a thickness of about 19 millimeters, and a density of 0.065 gram/centimeter$^3$, determined according to ASTM D1622-14. The surface of the sheet included projections corresponding to the grooves in the aluminum plates. The shaped foamed sheet did not exhibit cracks or surface wrinkles, and its thickness and density were uniform.

Example 4

The procedure of Example 1 was followed, except that the thermoplastic sheet had a thickness of 3 millimeters, the plate spacing during foaming was about 12 millimeters, foaming was conducted at 145° C. for 50 minutes, and the plate spacing during shaping was about 7 millimeters. The resulting flat foamed and shaped sheet had a thickness of about 7 millimeters, and a density of 0.15 gram/centimeter$^3$, determined according to ASTM D1622-14. The surface of the sheet included projections corresponding to the grooves in the aluminum plates. The shaped foamed sheet did not exhibit cracks or surface wrinkles, and its thickness and density were uniform.

Comparative Example 1

This experiment utilized an extruded sheet of Resin A having a length of 300 millimeters, a width of 200 millimeters, and thickness of 5 millimeters. Aluminum plates were not used in this experiment.

The extruded sheet was placed on the lower surface of the hydraulic press of the cavity of the foaming machine, which had been pre-heated to 160° C. The mold cavity of foaming machine was closed by the hydraulic system yielding a separation of about 50 millimeters between the upper and lower surfaces of the hydraulic press. Then, supercritical carbon dioxide was injected into the cavity of the foaming machine, and a temperature of 160° C. and a pressure of 20 megapascals of carbon dioxide were maintained for 60 minutes.

After the 60 minutes had elapsed, pressure was released through an exhaust port, and the cavity was opened. At this point, the foamed sheet had a warped (i.e., non-flat) shape. The foamed sheet was rapidly transferred to the shaping machine, which had an initial temperature of about 23° C., and the hydraulic presses of the shaping machine rapidly closed, creating a separation of about 20 millimeters between the upper and lower surfaces of the hydraulic press, and a pressure of about 0.6 megapascals. After five minutes, the separation between the upper and lower surfaces of the hydraulic press was increased to about 200 millimeters, and the shaped foamed sheet was removed from the shaping machine. The resulting shaped foamed sheet had a thickness of about 20 millimeters, and a density of 0.045 gram/centimeter$^3$, determined according to ASTM D1622-14, but it exhibited unacceptable cracking, and the surface of the foamed sheet exhibited unacceptable surface wrinkles.

Figure 3:
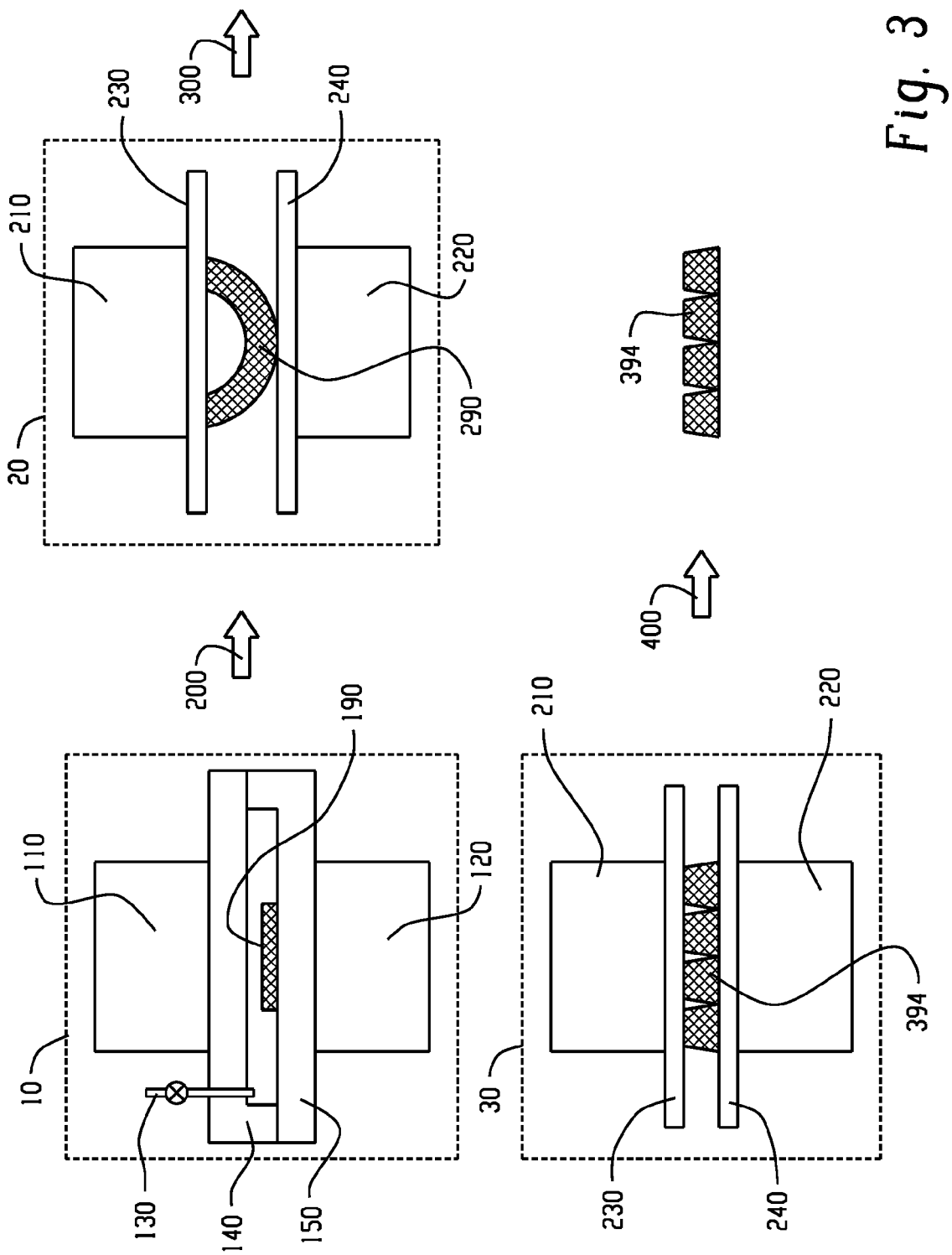
FIG. 3 is a schematic illustration of a comparative process for foaming and shaping a thermoplastic sheet without using the present invention's first and second metal plates, or the flexible linkage connecting the first and second metal plates.

The process is schematically illustrated in FIG. 3, which is similar to FIG. 2 except that a dual-plate/soft-link module was not employed, and the final product was shaped foamed sheet exhibiting cracking and surface wrinkling 394.

Comparative Example 2

This experiment utilized an extruded sheet of Resin A having a length of 300 millimeters, a width of 200 millimeters, and thickness of 5 millimeters. Also utilized were two aluminum plates with a length of 1000 millimeters, a width of 600 millimeters, and a thickness of 5 millimeters. The inner surfaces of both aluminum plates were machined to create a grid of perpendicular micro grooves with a width of 0.5 millimeter, a depth of 0.5 millimeter, and a center-to-center groove separation of 2 millimeters. The aluminum plates were connected with bolts to create a fixed separation of about 20 millimeters, thereby creating a dual-plate/fixed-separation module.

The extruded sheet was placed between the two aluminum plates. The cavity of the foaming machine was heated to 160° C., then the dual-plate/fixed-separation module containing the extruded sheet was placed in the foaming machine, and the mold cavity was closed. Then, supercritical carbon dioxide was injected into the cavity of the foaming machine, and a temperature of 160° C. and a pressure of 20 megapascals of carbon dioxide were maintained for 60 minutes.

After the 60 minutes had elapsed, pressure was released through an exhaust port, and the cavity was opened. At this point, the foamed sheet had a warped (i.e., non-flat) shape. The dual-plate/fixed-separation module containing the foamed sheet was rapidly transferred to the shaping machine, which had an initial temperature of about 23° C. The plate separation was still fixed at about 20 millimeters. After five minutes, the foamed sheet was removed from the dual-plate/fixed-separation module. The process is schematically illustrated in FIG. 3. The resulting shaped foamed sheet had a thickness of about 20 millimeters, and a density of 0.045 gram/centimeter$^3$, determined according to ASTM D1622-14, but the surface of the foamed sheet exhibited unacceptable surface wrinkles, and the thickness and density were not uniform across the sheet.

Figure 4:
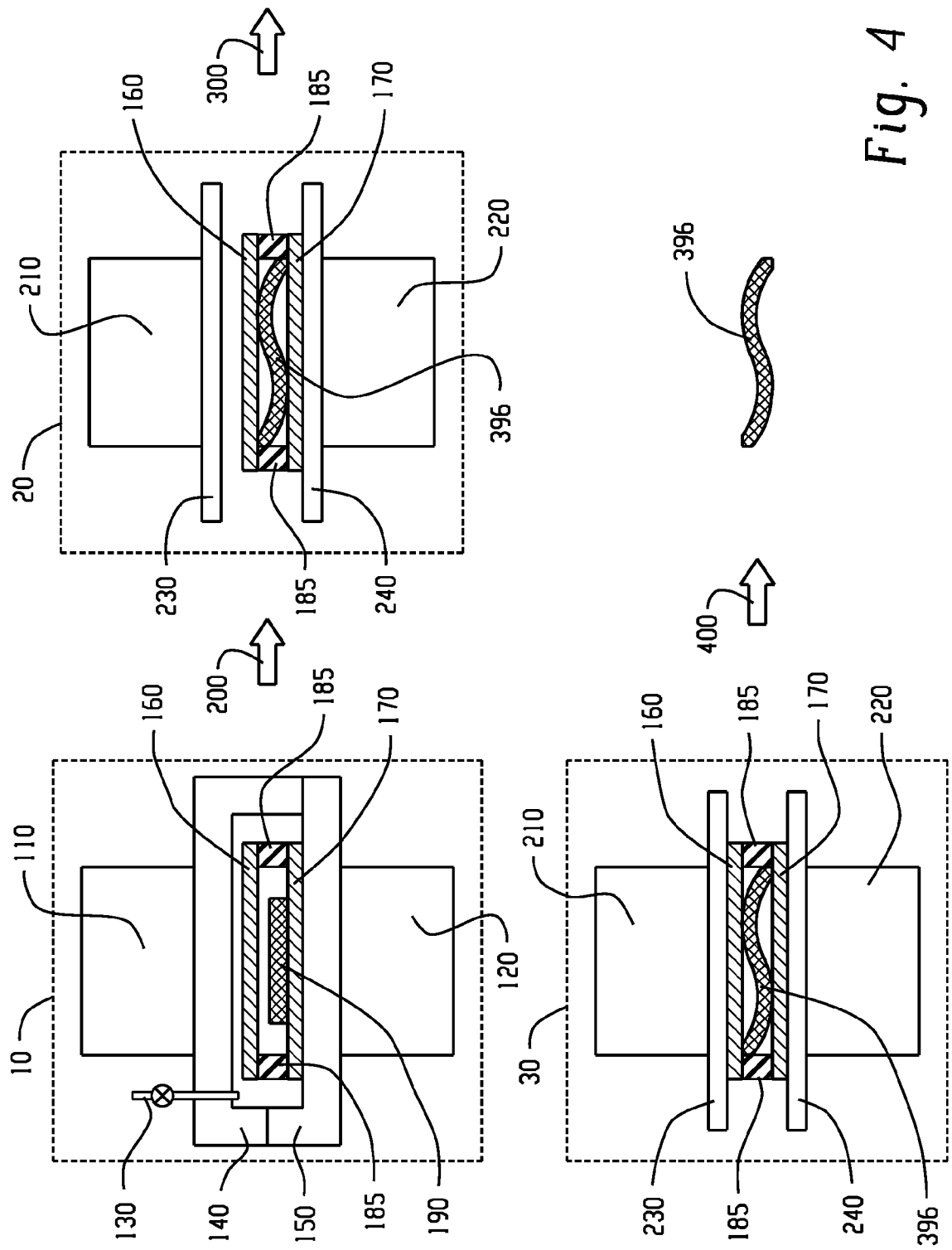
FIG. 4 is a schematic illustration of a comparative process for foaming and shaping a thermoplastic sheet without using the present invention's flexible linkage connecting the first and second metal plates.

The process is schematically illustrated in FIG. 4, which is similar to FIG. 2 except that the dual-plate/soft-link module is replaced with a dual-plate/fixed-separation module in which rigid spacers 185 connect and create a fixed separation of first metal plate 160 and second metal plate 170, and the final product was shaped foamed sheet exhibiting surface wrinkling, and non-uniform thickness and density 396.

Comparative Example 3

This experiment utilized an extruded sheet of Resin A having a length of 300 millimeters, a width of 200 millimeters, and thickness of 5 millimeters. Also utilized were two aluminum plates with a length of 1000 millimeters, a width of 600 millimeters, and a thickness of 5 millimeters. Neither aluminum plate was grooved. A dual-plate/soft-link module was created by perforating the four corners of the aluminum plates and connecting the aluminum plates to a soft link consisting of a metal wire hoop having a circular cross-section, a wire cross-sectional diameter of 1 millimeter and a hoop circumference of about 200 millimeters. The initial spacing between the two aluminum plates was about 25 millimeters, but the spacing could be reduced by compressing the dual-plate/soft-link module to create a plate spacing equivalent to or slightly less than (e.g., as much as 5 percent less than) the thickness of the final foam sheet.

The extruded sheet was placed between the two aluminum plates. The cavity of the foaming machine was heated to 160° C., then the dual-plate/soft-link module containing the extruded sheet was placed in foaming machine, and the mold cavity was closed. Closure of the mold cavity did not affect the plate separation of about 25 millimeters. Then, supercritical carbon dioxide was injected into the cavity of the foaming machine, and a temperature of 160° C. and a pressure of 20 megapascals of carbon dioxide were maintained for 60 minutes.

After the 60 minutes had elapsed, pressure was released through an exhaust port, and the cavity was opened. At this point, the foamed sheet had a warped (i.e., non-flat) shape.

The dual-plate/soft-link module containing the warped foamed sheet was rapidly transferred to the shaping machine, which had an initial temperature of about 23° C. The hydraulic presses of the shaping machine rapidly closed, creating a plate spacing of about 7 millimeters, a pressure of about 0.6 megapascals. After five minutes, the shaped foamed sheet was removed from the dual-plate/soft-link module. The resulting shaped foamed sheet had a thickness of about 7 millimeters, and a density of 0.15 gram/centimeter$^3$, but the thickness and density were not uniform across the sheet.

The process was similar to that schematically illustrated in FIG. 2, except that neither the first metal plate 160 nor the second metal plate 170 was grooved.

Table 3 summarizes the conditions and results for the experiments described above. In Table 3, "N/A" means not applicable. Examples 1-4 were conducted according to the present method and utilized a dual-plate/soft-link module in which both plates had grooved surfaces facing the thermoplastic sheet. The resulting shaped foamed sheets exhibited uniform thickness and density and were free of cracks and surface wrinkles. In Comparative Example 1, the dual-plate/soft-link module was not employed and during shaping, the foamed sheet was in direct contact with smooth surfaces of the hydraulic press. The resulting shaped foamed sheet exhibited cracking and surface wrinkling. In Comparative Example 2, the grooved aluminum plates were maintained at a fixed separation of 20 millimeters during foaming and shaping, and the resulting shaped foamed sheet exhibited surface wrinkles and non-uniform thickness and density. In Comparative Example 3, the aluminum plates lacked grooves, and the resulting shaped foamed sheet exhibited non-uniform thickness and density.

TABLE 3

|  | Ex. 1 | Ex. 2 | Ex. 3 | Ex. 4 |
|---|---|---|---|---|
| Thermoplastic Resin | A | A | B | A |
| Thermoplastic sheet dimensions (mm) | 300 × 200 × 5 | 300 × 200 × 5 | 300 × 200 × 5 | 300 × 200 × 3 |
| Aluminum plate dimensions (mm) | 1000 × 600 × 5 | 1000 × 600 × 5 | 1000 × 600 × 5 | 1000 × 600 × 5 |
| Foaming plate separation (mm) | 25 | 17 | 25 | 12 |
| Foaming temperature (° C.) | 160 | 145 | 165 | 145 |
| Foaming CO2 pressure (MPa) | 20 | 20 | 20 | 20 |
| Foaming time (minutes) | 60 | 60 | 70 | 50 |
| Shaping plate separation (mm) | 21 | 10 | 19 | 7 |
| Shaping pressure (MPa) | 0.6 | 0.6 | 0.6 | 0.6 |
| Shaping time (minutes) | 5 | 5 | 5 | 5 |
| Shaped sheet thickness (mm) | 21 | 10 | 19 | 7 |
| Shaped sheet density (g/cm$^3$) | 0.045 | 0.14 | 0.065 | 0.15 |
| Cracking in foamed sheet? | no | no | no | no |
| Wrinkled surface on foamed sheet? | no | no | no | no |
| Uniform thickness in foamed sheet? | yes | yes | yes | yes |
| Uniform density in foamed sheet? | yes | yes | yes | yes |

|  | C. Ex. 1 | C. Ex. 2 | C. Ex. 3 |
|---|---|---|---|
| Thermoplastic Resin | A | A | A |
| Thermoplastic sheet dimensions (mm) | 300 × 200 × 5 | 300 × 200 × 5 | 300 × 200 × 5 |
| Aluminum plate dimensions (mm) | N/A | 1000 × 600 × 5 | 1000 × 600 × 5 |
| Foaming plate separation (mm) | N/A | 20 | 25 |
| Foaming temperature (° C.) | 160 | 160 | 160 |
| Foaming CO2 pressure (MPa) | 20 | 20 | 20 |
| Foaming time (minutes) | 60 | 60 | 60 |
| Shaping plate separation (mm) | N/A | 20 | 7 |
| Shaping pressure (MPa) | 0.6 | 0.6 | 0.6 |
| Shaping time (minutes) | 5 | 5 | 5 |
| Shaped sheet thickness (mm) | 20 | 20 | 7 |
| Shaped sheet density (g/cm$^3$) | 0.045 | 0.045 | 0.15 |
| Cracking in foamed sheet? | yes | no | no |
| Wrinkled surface on foamed sheet? | yes | yes | no |
| Uniform thickness in foamed sheet? | yes | no | no |
| Uniform density in foamed sheet? | yes | no | no |

The invention includes at least the following aspects.

Aspect 1: A method of foaming and shaping a thermoplastic sheet, comprising: foaming a thermoplastic sheet with supercritical carbon dioxide to form a foamed thermoplastic sheet; wherein the thermoplastic sheet comprises a thermoplastic composition comprising a poly(phenylene ether), a polyetherimide, or a combination thereof; and wherein the thermoplastic composition is characterized by a glass transition temperature of 20 to 300° C. determined by differential scanning calorimetry according to ASTM D3418-15 at heating rate of 20° C./minute; and shaping the foamed thermoplastic sheet to form a shaped foamed thermoplastic sheet; wherein the shaping comprises compressing the foamed thermoplastic sheet between a first metal plate and a second metal plate; wherein a surface of the first metal plate and a surface of the second metal plate comprise a plurality of grooves, each groove having a width of 0.1 to 1 millimeter and a depth of 0.1 to 1 millimeter, and each groove being separated from the nearest groove by a center-to-center distance of 0.5 to 5 millimeters; wherein the first metal plate and the second metal plate are connected by a flexible linkage capable of modulating a separation between the first metal plate and the second metal plate; and wherein the compressing the foamed thermoplastic sheet between a first metal plate and a second metal plate comprises controlling a minimum separation of the first metal plate and the second metal plate.

Aspect 2: The method of aspect 1, wherein the flexible linkage comprises a metal wire, a metal band, poly(para-phenylene terephthalamide) fibers, carbon fibers, glass fibers, or a combination thereof.

Aspect 3: The method of aspect 1 or 2, wherein the flexible linkage comprises a metal wire or a metal band comprising galvanized iron, wherein the galvanized iron comprises 99.9 to 99.99 weight percent iron and 0.01 to 0.1 weight percent carbon, based on the weight of galvanized iron.

Aspect 4: The method of any one of aspects 1-3, wherein the thermoplastic composition comprises a poly(phenylene ether).

Aspect 5: The method of aspect 4, wherein the thermoplastic composition has a glass transition temperature of 100 to 300° C. and comprises, based on the total weight of the thermoplastic composition, 40 to 78 weight percent of the poly(phenylene ether); 10 to 48 weight percent of polystyrene, a rubber-modified polystyrene, or a combination thereof; 2 to 10 weight percent of a block copolymer comprising a polystyrene block and a polybutadiene block, a block copolymer comprising a polystyrene block and a hydrogenated polybutadiene block, or a combination thereof; and 10 to 20 weight percent of a flame retardant; wherein the sum of the weight percents of the poly(phenylene ether), the polystyrene or rubber-modified polystyrene or combination thereof, the block copolymer, and the flame retardant is 95 to 100 weight percent.

Aspect 6: The method of aspect 4, wherein the thermoplastic composition has a glass transition temperature of 100 to 300° C. and comprises, based on the total weight of the thermoplastic composition, 50 to 78 weight percent of the poly(phenylene ether); 10 to 38 weight percent of polystyrene, a rubber-modified polystyrene, or a combination thereof; 2 to 10 weight percent of a block copolymer comprising a polystyrene block and a polybutadiene block, a block copolymer comprising a polystyrene block and a hydrogenated polybutadiene block, or a combination thereof; and 10 to 20 weight percent of a flame retardant; wherein the sum of the weight percents of the poly(phenylene ether), the polystyrene or rubber-modified polystyrene or combination thereof, the block copolymer, and the flame retardant is 95 to 100 weight percent.

Aspect 7: The method of any one of aspects 1-3, wherein the thermoplastic composition comprises a polyetherimide.

Aspect 8: A shaped foamed thermoplastic sheet produced by the method of any one of aspects 1-7 and comprising a plurality of projections corresponding to the plurality of grooves of the first metal plate and the second metal plate.

Aspect 9: The shaped foamed thermoplastic sheet of aspect 8, wherein the thermoplastic composition comprises a poly(phenylene ether).

Aspect 10: The shaped foamed thermoplastic sheet of aspect 9, wherein the thermoplastic composition has a glass transition temperature of 100 to 300° C. and comprises, based on the total weight of the thermoplastic composition, 40 to 78 weight percent of the poly(phenylene ether); 10 to 48 weight percent of polystyrene, a rubber-modified polystyrene, or a combination thereof; 2 to 10 weight percent of a block copolymer comprising a polystyrene block and a polybutadiene block, a block copolymer comprising a polystyrene block and a hydrogenated polybutadiene block, or a combination thereof; and 10 to 20 weight percent of a flame retardant; wherein the sum of the weight percents of the poly(phenylene ether), the polystyrene or rubber-modified polystyrene or combination thereof, the block copolymer, and the flame retardant is 95 to 100 weight percent.

Aspect 11: The shaped foamed thermoplastic sheet of aspect 9, wherein the thermoplastic composition has a glass transition temperature of 100 to 300° C. and comprises, based on the total weight of the thermoplastic composition, 50 to 78 weight percent of the poly(phenylene ether); 10 to 38 weight percent of polystyrene, a rubber-modified polystyrene, or a combination thereof; 2 to 10 weight percent of a block copolymer comprising a polystyrene block and a polybutadiene block, a block copolymer comprising a polystyrene block and a hydrogenated polybutadiene block, or a combination thereof; and 10 to 20 weight percent of a flame retardant; wherein the sum of the weight percents of the poly(phenylene ether), the polystyrene or rubber-modified polystyrene or combination thereof, the block copolymer, and the flame retardant is 95 to 100 weight percent.

Aspect 12: The shaped foamed thermoplastic sheet of aspect 8, wherein the thermoplastic composition comprises a polyetherimide.

Aspect 13: An electric vehicle battery comprising the shaped foamed thermoplastic sheet of any one of aspects 8-12.

Aspect 14: An apparatus for shaping a foamed thermoplastic sheet, comprising: a first metal plate and a second metal plate; wherein each of the first metal plate and the second metal plate comprises a thermoplastic-facing major surface; wherein the thermoplastic-facing major surfaces of the first metal plate and the second metal plate comprise a plurality of grooves, each groove having a width of 0.1 to 1 millimeter and a depth of 0.1 to 1 millimeter, and each groove being separated from the nearest groove by a center-to-center distance of 0.5 to 5 millimeters; and wherein the thermoplastic-facing major surface of the first metal plate or the second metal plate or both comprises a rigid spacer to control the minimum separation of the first metal plate and the second metal plate; a flexible linkage connecting the first metal plate and the second metal plate, the flexible linkage being capable of modulating a separation between the first metal plate and the second metal plate; and a hydraulic system capable of compressing the flexible linkage connecting the first metal plate and the second metal plate.

Aspect 15: The apparatus of aspect 14, wherein the flexible linkage comprises a metal wire, a metal band, poly(para-phenylene terephthalamide) fibers, carbon fibers, glass fibers, or a combination thereof.

The invention claimed is:

1. A method of foaming and shaping a thermoplastic sheet, comprising:
   foaming a thermoplastic sheet with supercritical carbon dioxide to form a foamed thermoplastic sheet; wherein the thermoplastic sheet comprises a thermoplastic composition comprising a poly (phenylene ether), a polyetherimide, or a combination thereof; and wherein the thermoplastic composition is characterized by a glass transition temperature of 20 to 300° C. determined by differential scanning calorimetry according to ASTM D3418-15 at heating rate of 20° C./minute; and
   shaping the foamed thermoplastic sheet to form a shaped foamed thermoplastic sheet; wherein the shaping comprises compressing the foamed thermoplastic sheet between a first metal plate and a second metal plate; wherein a surface of the first metal plate and a surface of the second metal plate comprise a plurality of grooves, each groove having a width of 0.1 to 1 millimeter and a depth of 0.1 to 1 millimeter, and each groove being separated from the nearest groove by a center-to-center distance of 0.5 to 5 millimeters; wherein the first metal plate and the second metal plate are connected by a flexible linkage capable of modulating a separation between the first metal plate and the second metal plate; and wherein the compressing the foamed thermoplastic sheet between a first metal plate and a second metal plate comprises controlling a minimum separation of the first metal plate and the second metal plate.

2. The method of claim 1, wherein the flexible linkage comprises a metal wire, a metal band, poly (para-phenylene terephthalamide) fibers, carbon fibers, glass fibers, or a combination thereof.

3. The method of claim 1, wherein the flexible linkage comprises a metal wire or a metal band comprising galvanized iron, wherein the galvanized iron comprises 99.9 to 99.99 weight percent iron and 0.01 to 0.1 weight percent carbon, based on the weight of galvanized iron.

4. The method of claim 1, wherein the thermoplastic composition comprises a poly (phenylene ether).

5. The method of claim 4, wherein the thermoplastic composition has a glass transition temperature of 100 to 300° C. and comprises, based on the total weight of the thermoplastic composition, 40 to 78 weight percent of the poly (phenylene ether); 10 to 48 weight percent of polystyrene, a rubber-modified polystyrene, or a combination thereof; 2 to 10 weight percent of a block copolymer comprising a polystyrene block and a polybutadiene block, a block copolymer comprising a polystyrene block and a hydrogenated polybutadiene block, or a combination thereof; and 10 to 20 weight percent of a flame retardant; wherein the sum of the weight percents of the poly (phenylene ether), the polystyrene or rubber-modified polystyrene or combination thereof, the block copolymer, and the flame retardant is 95 to 100 weight percent.

6. The method of claim 4, wherein the thermoplastic composition has a glass transition temperature of 100 to 300° C. and comprises, based on the total weight of the thermoplastic composition, 50 to 78 weight percent of the poly (phenylene ether); 10 to 38 weight percent of polystyrene, a rubber-modified polystyrene, or a combination thereof; 2 to 10 weight percent of a block copolymer comprising a polystyrene block and a polybutadiene block, a block copolymer comprising a polystyrene block and a hydrogenated polybutadiene block, or a combination thereof; and 10 to 20 weight percent of a flame retardant; wherein the sum of the weight percents of the poly (phenylene ether), the polystyrene or rubber-modified polystyrene or combination thereof, the block copolymer, and the flame retardant is 95 to 100 weight percent.

7. The method of claim 1, wherein the thermoplastic composition comprises a polyetherimide.

8. A shaped foamed thermoplastic sheet produced by the method of claim 1 and comprising a plurality of projections corresponding to the plurality of grooves of the first metal plate and the second metal plate.

9. The shaped foamed thermoplastic sheet of claim 8, wherein the thermoplastic composition comprises a poly (phenylene ether).

10. The shaped foamed thermoplastic sheet of claim 9, wherein the thermoplastic composition has a glass transition temperature of 100 to 300° C. and comprises, based on the total weight of the thermoplastic composition, 40 to 78 weight percent of the poly (phenylene ether); 10 to 48 weight percent of polystyrene, a rubber-modified polystyrene, or a combination thereof; 2 to 10 weight percent of a block copolymer comprising a polystyrene block and a polybutadiene block, a block copolymer comprising a polystyrene block and a hydrogenated polybutadiene block, or a combination thereof; and 10 to 20 weight percent of a flame retardant; wherein the sum of the weight percents of the poly (phenylene ether), the polystyrene or rubber-modified polystyrene or combination thereof, the block copolymer, and the flame retardant is 95 to 100 weight percent.

11. The shaped foamed thermoplastic sheet of claim 9, wherein the thermoplastic composition has a glass transition temperature of 100 to 300° C. and comprises, based on the total weight of the thermoplastic composition, 50 to 78 weight percent of the poly (phenylene ether); 10 to 38 weight percent of polystyrene, a rubber-modified polystyrene, or a combination thereof; 2 to 10 weight percent of a block copolymer comprising a polystyrene block and a polybutadiene block, a block copolymer comprising a polystyrene block and a hydrogenated polybutadiene block, or a combination thereof; and 10 to 20 weight percent of a flame retardant; wherein the sum of the weight percents of the poly (phenylene ether), the polystyrene or rubber-modified polystyrene or combination thereof, the block copolymer, and the flame retardant is 95 to 100 weight percent.

12. The shaped foamed thermoplastic sheet of claim 8, wherein the thermoplastic composition comprises a polyetherimide.

13. An electric vehicle battery comprising the shaped foamed thermoplastic sheet of claim 8.

14. An apparatus for shaping a foamed thermoplastic sheet, comprising: a first metal plate and a second metal plate; wherein the foamed thermoplastic sheet comprises a thermoplastic composition is characterized by a glass transition temperature of 20 to 300° C. determined by differential scanning calorimetry according to ASTM D3418-15 at heating rate of 20° C./minute; wherein each of the first metal plate and the second metal plate comprises a thermoplastic-facing major surface; wherein the thermoplastic-facing major surfaces of the first metal plate and the second metal plate comprise a plurality of grooves, each groove having a width of 0.1 to 1 millimeter and a depth of 0.1 to 1 millimeter, and each groove being separated from the nearest groove by a center-to-center distance of 0.5 to 5 millimeters; and wherein the thermoplastic-facing major surface of the first metal plate or the second metal plate or both comprises a rigid spacer to control a minimum separation of the first metal plate and the second metal plate; a flexible linkage connecting the first metal plate and the second metal plate, the flexible linkage being capable of modulating a separation between the first metal plate and the second metal plate; and a hydraulic system capable of compressing the flexible linkage connecting the first metal plate and the second metal plate.

15. The apparatus of claim 14, wherein the flexible linkage comprises a metal wire, a metal band, poly (para-phenylene terephthalamide) fibers, carbon fibers, glass fibers, or a combination thereof.

* * * * *